UNITED STATES PATENT OFFICE.

JOHN M. ORDWAY, OF NEW ORLEANS, LOUISIANA.

PROCESS OF PURIFYING LIQUIDS.

SPECIFICATION forming part of Letters Patent No. 621,128, dated March 14, 1899.

Application filed July 16, 1898. Serial No. 686,112. (No specimens.)

*To all whom it may concern:*

Be it known that I, JOHN M. ORDWAY, a citizen of the United States, residing at New Orleans, in the parish of Orleans and State of Louisiana, have invented a certain new and useful Improvement in Purifying Liquids, of which the following is a specification.

The object of my invention is to rapidly and cheaply purify water and other liquids; and it consists in the employment of certain soluble basic salts of the sesquioxides for the precipitation of coloring-matters and albuminoids or other mineral substances causing turbidity of the liquid.

It is well known that the normal salts of iron and aluminum may be used for precipitating organic matter from impure waters. Some of the basic persalts of iron have also been recommended for this purpose. I have ascertained by numerous experiments that the normal aluminic and ferric salts are in many cases slow and inefficient in their operation. The same is also true of some of the basic ferric salts. Moreover, some of the basic salts which have been proposed for such use are liable to undergo a change and become rusty and gelatinous in a few days after they have been prepared, and they thereby lose much of their power.

I find that the basic chlorides and nitrates of aluminum can be prepared without danger of being spoiled during the manufacture, and when made they are permanent so long as they are not allowed to dry up. I find that these compounds are far superior to the ferric salts for such waters as are colored by humic acid, since alumina, as compared with ferric hydrates, has a much stronger affinity for humic acid and forms therewith a totally-insoluble combination, so that the precipitation is much more rapid and complete. I find, further, that for turbid waters, like that of the lower Mississippi river, the best precipitant is a combination of basic chlorides or nitrates of alumina with those of iron, and if these salts are mixed in suitable proportions the compounds undergo no change by keeping any length of time. The mixtures must be such as contain not more than one atom of iron to two atoms of aluminum and must be free from sulphates.

My invention then consists of the process of purifying waters containing humic acid or peaty matter by treating them with a bibasic chloride of aluminum, ($Al_2Cl_6 + Al_2O_3 + H_2O$;) also by treating them with a soluble combination of bibasic chlorides of aluminum and iron, in which there are at least two atoms of aluminum for one atom of iron and which may be represented thus—

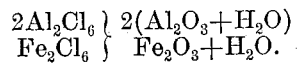

To enable persons skilled in chemical arts to make and use my invention, I here describe the best methods by which the substances may be prepared.

To make the bibasic chloride of aluminum, I pour into a cold solution containing fifty-three parts, by weight, of carbonate of sodium ($Na_2CO_3$) a solution of one hundred and eleven parts of sulphate of aluminum, ($Al_2S_3O_{12} + 18H_2O$.) It is well to have each of the salts dissolved in at least twenty times its weight of water. The precipitated hydrate of aluminum is to be washed several times, collected on a filter, and well drained. It is then heated with as much strong hydrochloric acid as contains eighteen parts, by weight, of hydrogen chloride (HCl) till a clear solution is formed.

In order to reduce the cost to a minimum, I may form a normal chloride ($Al_2Cl_6$) by digesting the mineral bauxite with strong hydrochloric acid and add thereto a hydrate formed by precipitating it with carbonic acid from a weak solution of aluminite of sodium prepared directly from bauxite.

To make the double combination of aluminum and iron, I pour a solution of four hundred and fifty-four parts of aluminum sulphate ($Al_2S_3O_{12} + 18H_2O$) into a cold solution of two hundred and twelve parts of sodium carbonate ($Na_2CO_3$) and make up the whole with water to thirty thousand parts or more. The product after being well washed and drained as completely as possible is heated with one hundred and nine parts of hydrochloric acid at 21° Baumé containing thirty-six and one-half parts of HCl till a clear solution is formed. This tetrabasic chloride of aluminum ($Al_2Cl_6 + 3Al_2O_3 + H_2O$) is mixed with a strong solution of normal ferric chloride ($Fe_2Cl_6$) containing iron equivalent to twenty-seven parts of the peroxide, ($Fe_2O_3$.) The perchloride of iron is made by digesting for several days hematite iron ore with very strong hydrochloric acid. It may also be prepared in the ordinary well-known way by oxidizing ferrous chloride with nitric acid.

Of course I can also make the desired combination by mixing bibasic aluminum chloride with bibasic ferric chloride, the latter being formed by dissolving precipitated ferric hydrate in normal ferric chloride without the aid of heat. In this case, as the basic ferric chloride is liable to change, it must be mixed with the aluminum salt while still freshly prepared.

I do not restrict myself to the chlorides, as the corresponding nitrates are quite as good; and in the case of the compound of two bases I do not limit myself to the exact proportion above specified. The combination may be made somewhat more or less basic, and while there must not be more than one atom of iron to two atoms of aluminum the relative amount of aluminum may be indefinitely increased.

In the actual use of these preparations I first determine by tentative trials how much of the basic salt or salts is required for a given water by diluting a known quantity of the precipitant with several times its volume of water, so as to facilitate accuracy of measurement. I fill several vessels A, B, C, &c., each holding two litres, with some of the water to be purified and add of the diluted precipitant one cubic centimeter to A, two cubic centimeters to B, three cubic centimeters to C, and so on. After a few minutes the effect is noted and the vessel which shows the best result indicates the proper quantity of precipitant to be used. Having learned the value of the precipitant, I add the right quantity, no more nor less, to a known measure of the water and mix thoroughly. After a few minutes the cleared water may be drawn off from over the sediment and passed through any rapidly-acting filter, or it may simply be allowed to settle. In the clarification of vegetable juices or extracts it is generally advantageous to apply heat when the basic salt is added.

Having described my invention, what I claim as new, and desire to secure by Letters Patent, is—

1. The process of purifying liquids which consists in treating the same with bibasic chloride of aluminum, substantially as described.

2. The process of purifying liquids which consists in treating the same with bibasic chloride of aluminum combined with bibasic ferric chloride, substantially as described.

In testimony whereof I affix my signature, in the presence of two witnesses, this 14th day of July, 1898.

JOHN M. ORDWAY.

Witnesses:
EDWARD A. BANGS,
CHARLES MASON.